Sept. 15, 1964     H. R. SPREEUWERS     3,148,412
SCREW EXTRUDER FOR MIXING PLASTIC MATERIAL WITH A PIGMENT
Filed June 22, 1961     3 Sheets-Sheet 1

FIG. I

INVENTOR.
HARM ROELF SPREEUWERS
BY Sherman and Sherman
ATTORNEY

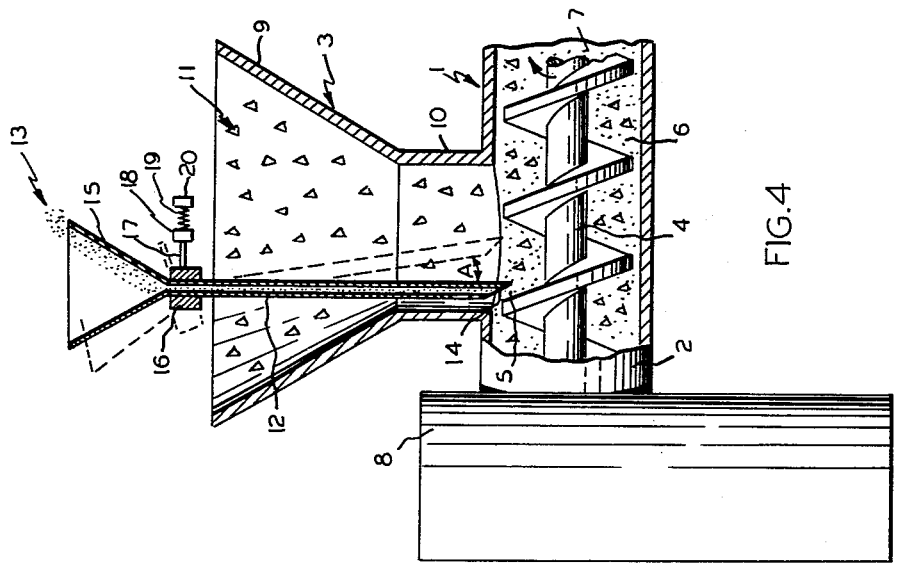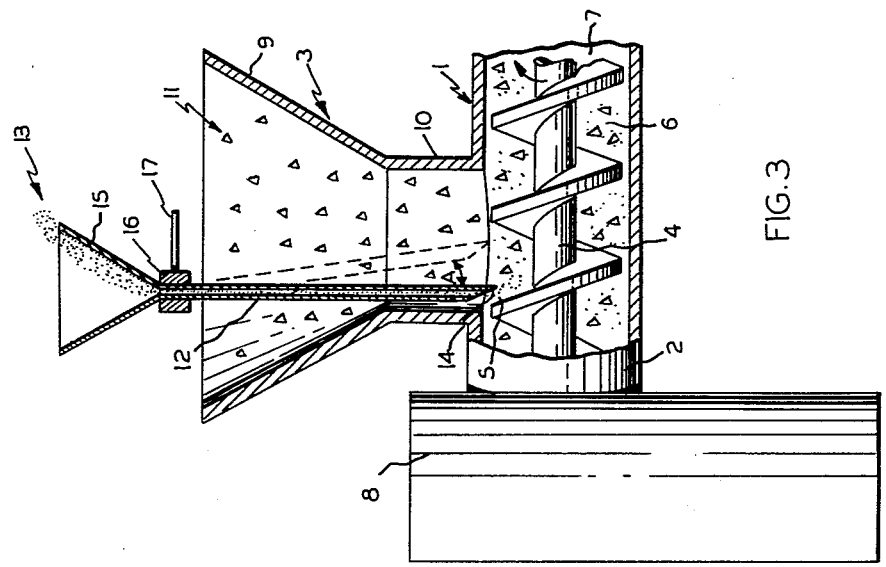

United States Patent Office 3,148,412
Patented Sept. 15, 1964

3,148,412
SCREW EXTRUDER FOR MIXING PLASTIC
MATERIAL WITH A PIGMENT
Harm Roelf Spreeuwers, Zeist, Netherlands, assignor to
N.V. Onderzoekingsinstituut Research, Arnhem, Netherlands, a corporation of the Netherlands
Filed June 22, 1961, Ser. No. 118,839
Claims priority, application Netherlands June 22, 1960
3 Claims. (Cl. 18—12)

This invention relates to an improved apparatus for extruding plastic materials and relates more particularly to an improved apparatus for mixing and homogenizing thermoplastic compositions. More specifically, this invention relates to the mixing of a thermoplastic substance with larger amounts of a different solid substance, particularly a pigment, than has heretofore been possible.

In its broadest aspect, this invention contemplates the use of a well known screw extruder to mix and blend the thermoplastic material with the pigment wherein the pigment is fed to the screw extruder upstream in relation to the main stream of the thermoplastic material.

Heretofore, various means have been employed to blend thermoplastic materials with such modifying agents as plasticizers, lubricants, pigments or dyes, and the like. In one known method, the thermoplastic substance and the other substance to be mixed therewith are transported by means of conveyor belts, the speeds of which are adjusted relative to each other, depending on the mixing ratio desired, to a point over the feed hopper of a well known screw extruder, from which point the two substances drop freely into the hopper. This method, however, does not result in a satisfactory uniformity of distribution of the substances in the mixture.

Another well known method heretofore employed was the coating of the thermoplastic substance in granular form. That is, the rolling of the granules of the thermoplastic substance in the pigment. The coating, preferably, was carried out at a somewhat elevated temperature in the presence of an adhesive, e.g., paraffin wax having a low melting point, the adhesive making it possible to cause a greater amount of pigment to adhere to the granules. The coated granules were then fed to the feed hopper of a screw extruder for the purpose of obtaining molded articles. Nevertheless, the amount of pigment on the granules was still relatively small.

It is, therefore, an object of this invention to provide an improved apparatus for blending thermoplastic materials with pigments or dyes.

It is another object of this invention to provide an apparatus for mixing a thermoplastic substance with larger amounts of pigments than has heretofore been possible.

It is a further object of this invention to provide an improved apparatus that permits the thermoplastic material and pigments to be mixed more homogeneously.

Further and additional objects of this invention will be apparent from the detailed disclosure set forth hereinbelow.

As previously set forth, this invention relates to an apparatus for mixing of a thermoplastic substance with another substance, namely a pigment wherein said pigment is fed to the extruder upstream with respect to the main stream of the thermoplastic substance.

This mixing method can be accomplished in various ways. In the first place, the screw extruder may be provided with a second feed hopper into which the pigment is fed while the thermoplastic substance is poured into the usual feed hopper.

In accordance with this invention, the feed hopper for the pigment must be positioned at a greater distance from the delivery end of the screw extruder than the feed hopper for the thermoplastic substance. Moreover, the pigment feed hopper must be so dimensioned, or provided with a proportioning device, that the pigment, when it reaches this conveyor screw of the extruder, is in the desired ratio to the thermoplastic substance.

A simpler construction, however, is the dividing of the feed hopper of the screw extruder by means of a partition located transverse to the axis of the conveyor screw. The pigment is thus fed through the passage located furthest from the delivery end of the extruder while the thermoplastic substance is fed through the other half of the hopper.

At a relatively high ratio between the amount of thermoplastic substance and the amount of pigment, there may be the drawback of the relatively smaller amount of pigment gravitating to the bottom of the screw channel so that it is less easily mixed with the thermoplastic substance in the remaining part of the screw channel. While it is true that this drawback may be removed by using a longer screw or by increasing the screw speed, resulting in an increase of the mixing action, the preferred embodiment of this present invention provides a simpler way of eliminating this obstacle. This invention provides for the feeding of the proportionally smaller amount of pigment to be processed to the screw of the extruder in proportion to an eccentric stream within the stream of the thermoplastic substance. By employing this method, part of the proportionally smaller amount of pigment is taken up by the thermoplastic substance before it has reached the screw channel, thereby resulting in a more homogeneous mixture of the two substances.

In the preferred embodiment of the instant invention, a second feed hopper comprises a feed tube which extends into the first feed hopper and emerges near the screw of the extruder and near the part of the wall of the first feed hopper away from the delivery end of the extruder. The obvious advantage of the use of this apparatus consists in that the pigment emerges from the feed tube at a level below that of the granular thermoplastic substances in the first feed hopper. This prevents the flying about of the usually powdery pigment in the work room.

As far as the feed tube is concerned, its length may vary depending on the way the tube is attached. If the feed tube is permanently mounted in relation to the screw extruder, then it may not project beyond the lower end of the feed hopper. However, if said feed tube is adjustably mounted, the lower end of said tube may be projected into the casing of the screw extruder and into the channel for the conveyor screw, between the threads thereof. Care must be taken so that the tube does not get wedged in the threads of the conveyor screw. In other words, it must be possible for the lower end of the feed tube, after said tube has left its initial fixed position in turning through a small angle, to leap over the edge of the screw blade and move back to its initial position. To assist the tube in moving back a spring may be used. Movability can also be obtained by using a feed tube of a resilient material. Such a to and fro movement of the feed tube furthers the mixing of the substances.

Moreover, it has been found that a steady flow of the pigment out of the feed tube can be improved by bevelling the lower end of the feed tube such that the delivery end of said tube faces the side or nearest feed hopper wall, furthest removed from the delivery end of the extruder.

By preference, the feed tube is so bevelled that the lower end of the tube and the neighboring wall part of the feed hopper diverge in the direction of the extruder screw.

The invention will be further illustrated with reference to the accompanying drawings of which:

FIGURE 3 is a side view partially in vertical section of an additional embodiment of the screw extruder of the invention wherein a flexible feed tube is employed; and FIGURE 4 is a side view partially in vertical section of a further embodiment of the screw extruder of the invention provided with a spring biased feed tube.

Figure 1:
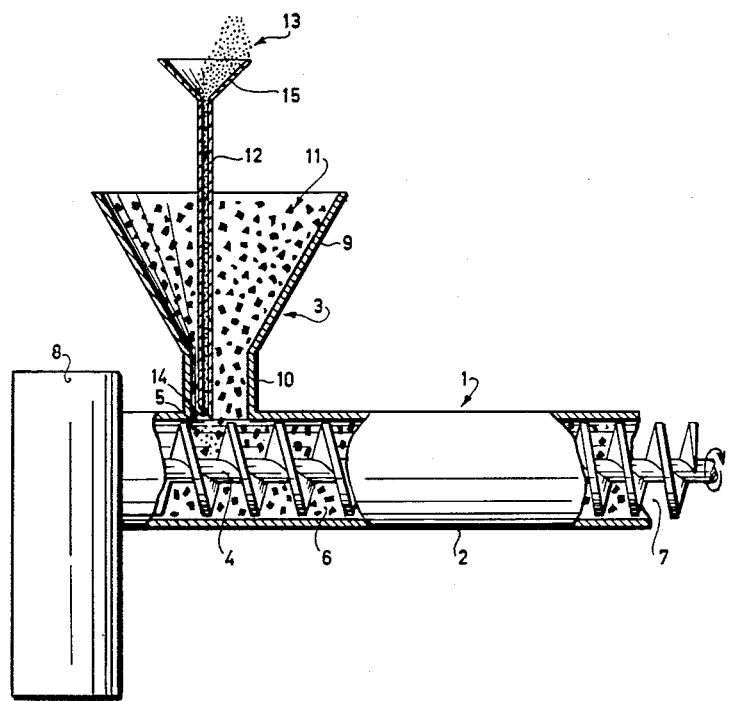
FIGURE 1 is a side view partially in vertical section of an embodiment of a screw extruder of the invention.

With reference to FIGURE 1, reference numeral 1 designates a screw extruder of the type used for the extrusion of thermoplastic material. The screw extruder 1 consists of a casing 2, a funnel-shaped feed hopper 3 and a screw 4. The casing 2 comprises a feed zone 5, a melt zone 6 and a delivery zone 7. The screw 4 is rotatably mounted in the casing 2 of the screw extruder 1 and is driven by a (merely diagrammatically represented) driving mechanism 8.

The feed hopper 3 comprises, as is conventional, a cone-shaped feed zone 9 and a cylindrical delivery zone 10. Thermoplastic material 11 in the form of granules or chips is fed into the hopper 3, and, upon starting the driving mechanism 8 it flows from the feed hopper 3 by way of the feed zone 9 and the delivery zone 10 of the feed hopper 3 to the feed zone 5 of the casing 2 of the screw extruder.

A tube 12 extends into the feed hopper 3 of the screw extruder 1. The pigment 13 which is to be mixed with the thermoplastic substance can be fed into the tube 12 by a proportioning device (not shown). As is evident from FIGURE 2, the tube 12 is placed in and eccentric to the feed hopper 3 and near that side of the feed hopper 3 which is furthest away from the delivery zone 7 of the screw extruder 1. However, the tube 12 is still at such a distance from the nearest wall section of said hopper that granular thermoplastic material 11 can pass freely between the tube 12 and the neighboring wall section of the feed hopper 3. The distance between the tube 12 and said wall section of the feed hopper 3 must therefore be chosen in accordance with the size of the granules or chips of thermoplastic material 11.

Figure 2:
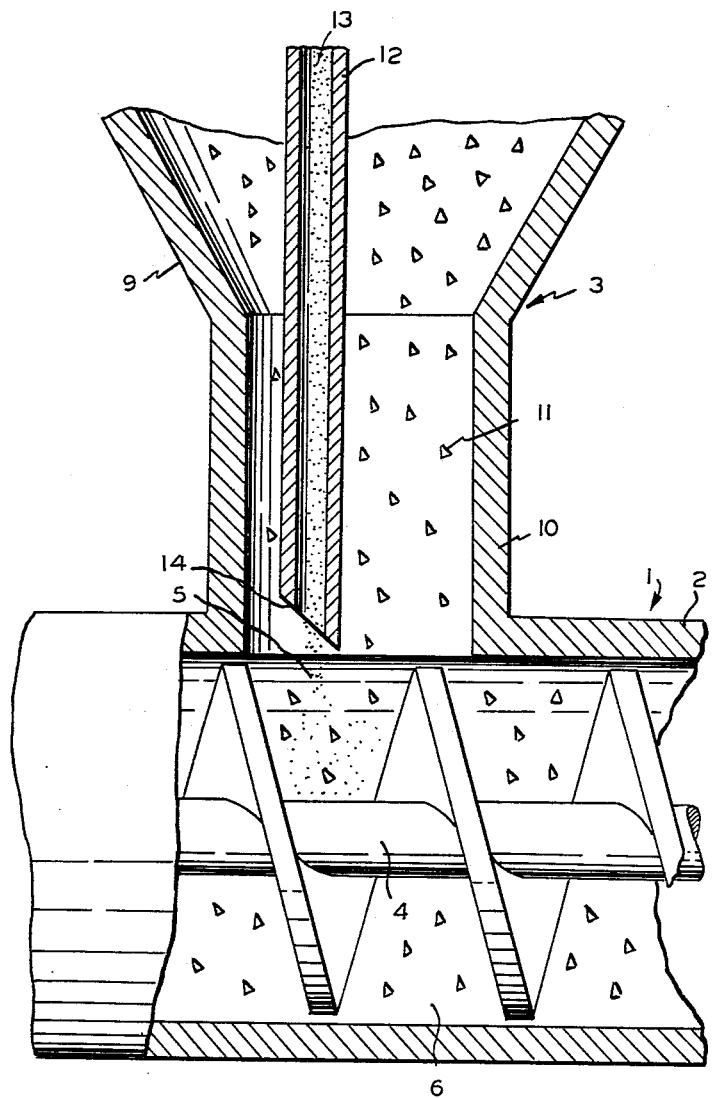
FIGURE 2 is an enlarged view of the screw extruder of FIGURE 1 in the area in which the screw and feed hopper communicate.

The tube 12 extends with its lower end 14 to near the circumference of the conveyor screw 4 (FIGURE 2). For the purpose of furthering the mixing of the thermoplastic material 11 with the substance 13, the lower end 14 of the tube 12 is bevelled, as shown in FIGURE 2, so that the delivery end of the tube 12 faces the neighboring wall section of the feed hopper 3.

With the embodiment described, the delivery zone 10 of the hopper and the delivery end 14 of the tube diverge downwards owing to the cylindrical shape of the delivery zone 10 of the feed hopper 3. With an entirely conical shape of the feed hopper 3, the tube 12 is preferably so bevelled that in that case too there exists said divergence of the hopper wall and the bevelled end of the tube 12. In order to facilitate the feeding of the substance to the tube 12, the latter may be provided at the top with a funnel-shaped expansion 15. The width of the tube 12 is preferably adapted to the desired mixing ratio between the substances 11 and 13.

With the aid of the device described, polymerized polyaminocaproic acid was mixed with such an amount of graphite powder that the mixture obtained contained 15% by weight of the latter substance. In carrying out this method the screw extruder was first heated to a temperature of 280° C. Upon reaching this temperature, the feed hopper 3 was filled with granular polymerized polyaminocaproic acid measuring 3 x 3 mm. Subsequently the driving mechanism for the conveyor screw 4 was switched on and the proportioned feed of graphite powder to the tube 12 was started. From the delivery zone 7 of the casing 2 the mixture was discharged in the form of strip of H-shaped cross-section. This strip showed great uniformity with regard to the distribution of the pigment in the polyamide. The mixture can also be processed into a thick wire which is chopped into granules. Preferably, the tube 12 is so arranged that the end 14 thereof extends between the threads of conveyor screw 4, as shown in FIGURES 3 and 4, whereby end 14 is adapted to be slightly displaced in relation to its initial position upon the rotation of conveyor screw 4. In the embodiment of the invention shown in FIGURE 3, feed tube 12 is formed of a resilient material and the neck thereof adjacent funnel 15 is fixedly attached to support member 17 by collar 16. In the embodiment of the invention shown in FIGURE 4, end 14 of feed tube 12 is adapted for to-and-fro movement in that collar 16 is attached to support member 20 through a spring 19.

The granules thus treated have the advantage, as compared with coated granules, that during their transport, there is no separation of polyamide and pigment. From these granules objects can subsequently be obtained by injection molding or by extrusion.

Moreover, it is possible to feed the mixture of the thermoplastic substance and other substance directly to an injection molding or another stroke-extrusion machine while it is still in the plastic state.

As examples of other substances which according to the invention can be readily mixed with thermoplastic substances may be mentioned carbon black (in amounts of 2 to 5% or more), molybdenum sulphide (e.g., 4%) or amorphous silicic acid, which is very bulky and hence difficult to process.

Having described the invention, what is desired to be secured by Letters Patent is:

1. A screw extruder for homogeneously mixing a thermoplastic material with a pigment including a feed hopper for feeding thermoplastic material to the screw extruder and a feed tube for feeding a pigment to the screw extruder, said feed tube being positioned within said feed hopper adjacent to but removed from the wall section of said feed hopper farthest removed from the delivery end of the screw extruder, and the lower end of said feed tube being adjacent the threads of the conveyor screw of said extruder so that pigment is fed directly to the conveyor screw of said extruder in an area adjacent the threads thereof during the rotation of said conveyor screw, said lower end of said feed tube being beveled, with the beveled surface facing said adjacent wall section of said feed hopper.

2. A screw extruder for homogeneously mixing a thermoplastic material with a pigment including a feed hopper for feeding thermoplastic material to the conveyor screw of said screw extruder and a feed tube for feeding a pigment to said conveyor screw, said feed tube being made of a flexible material and being positioned within said feed hopper adjacent the wall section thereof farthest removed from the delivery end of said screw extruder with the lower end of said feed tube extending between the threads of said conveyor screw of said extruder, whereby upon the rotation of said conveyor screw said lower end of said feed tube is caused to undergo a to-and-fro movement.

3. A screw extruder for homogeneously mixing a thermoplastic material with a pigment including a feed hopper for feeding thermoplastic material to the conveyor screw of said screw extruder and a feed tube for feeding a pigment to said conveyor screw, said feed tube being provided with spring means for biasing said feed tube and being positioned within said feed hopper adjacent the wall section thereof farthest removed from the delivery end of said screw extruder, with the lower end of said feed tube extending between the threads of said conveyor screw of said extruder, whereby upon the rotation of said conveyor screw said lower end of said feed tube is caused to undergo a to-and-fro movement.

References Cited in the file of this patent

UNITED STATES PATENTS

| | | |
|---|---|---|
| 2,382,655 | Nichols | Aug. 14, 1945 |
| 2,604,659 | Eppler | July 29, 1952 |
| 2,863,649 | Grubb | Dec. 9, 1958 |
| 3,000,618 | Oakes | Sept. 19, 1961 |

FOREIGN PATENTS

| | | |
|---|---|---|
| 153,886 | Australia | Sept. 6, 1951 |